United States Patent [19]

Brentrup

[11] Patent Number: 5,264,013
[45] Date of Patent: Nov. 23, 1993

[54] METHOD AND APPARATUS FOR PURIFICATION OF EXIT GASES FROM KILN INSTALLATIONS

[75] Inventor: Ludger Brentrup, Oelde, Fed. Rep. of Germany

[73] Assignee: Krupp Polysius AG, Fed. Rep. of Germany

[21] Appl. No.: 891,283

[22] Filed: May 29, 1992

[30] Foreign Application Priority Data

Jun. 19, 1991 [DE] Fed. Rep. of Germany ....... 4120277

[51] Int. Cl.$^5$ ............................................. B01D 53/04
[52] U.S. Cl. ................................... 95/128; 95/129; 95/134; 95/137; 96/126; 432/69
[58] Field of Search ............. 55/1, 68, 73, 72, 124, 55/126; 34/58, 78–80, 82, 135; 110/29; 432/72, 67–71

[56] References Cited

U.S. PATENT DOCUMENTS

| | | | |
|---|---|---|---|
| 4,006,066 | 2/1977 | Sparwald | 55/124 |
| 4,500,327 | 2/1985 | Nishino et al. | 55/72 |
| 4,813,978 | 3/1989 | Hirth | 55/72 |

FOREIGN PATENT DOCUMENTS 40187861 12/1991 Fed. Rep. of Germany.

*Primary Examiner*—Charles Hart
*Attorney, Agent, or Firm*—Learman & McCulloch

[57] ABSTRACT

In this method and this apparatus exit gases to be purified from kiln installations are first of all dedusted in a first filter stage and then in at least one further filter stage they are purified of the $NH_x$ compounds and/or volatile pollutant elements and compounds with at least partial reduction of $NO_x$ with the aid of a carbonaceous filter medium. In order that the filter dust precipitated in the first filter stage can without problems either be re-used in a suitable manner of deposited in simple refuse dumps, the proportion of low-boiling pollutants and pollutant compounds in this precipitated filter dust is reduced by successive method steps in which the said pollutants are evaporated out of the filter dust, the quantities of dust are precipitated out of these vapors and the dedusted vapours are passed through a filter unit containing a carbonaceous filter medium.

20 Claims, 1 Drawing Sheet

METHOD AND APPARATUS FOR PURIFICATION OF EXIT GASES FROM KILN INSTALLATIONS

The invention relates to a method and to apparatus for the purification of exit gases from kiln installations, particularly industrial kiln installations.

Purification methods and apparatus of this type can be used in kiln installations, particularly industrial kiln installations, for various purposes, such as for producing specific products or also for combustion of waste and refuse. A particularly typical example is disclosed in U.S. application Ser. No. 635,992, filed Dec. 31, 1990, now U.S. Pat. No. 5,169,611, for use in the production of cement clinker, in which cement raw material is preheated in a preheating zone with the hot exit gases from a final burning zone and at least partially deacidified before the material thus preheated is finally burnt in the final burning zone to produce cement clinker. In this case the exit gases from the preheating zone belonging to the kiln installation are purified in a multi-stage filter stage operating on a dry basis, the exit gases being dedusted in a first filter stage and then purified of $NH_x$ and/or heavy metals and trace elements as well as $SO_2$ and $NO_x$ in at least one further filter stage. Before the first filter stage the incoming exit gases should be set to a filter zone entry temperature such that at least a proportion of the highly volatile pollutant elements and compounds are precipitated out of the exit gases in this first filter stage together with the collected filter dust, whilst the binding of the remaining pollutants and the reduction of the $NO_x$ and possibly $SO_2$ is carried out in the further filter stage (or the further filter stages).

The filter dust collected in the first filter stage is predominantly fine cement raw material, so that for economic reasons it is endeavoured to return the collected filter dust to the cement production process. However, since the precipitated pollutant elements and compounds, such as for example low-boiling heavy metals, particularly mercury, and their compounds are also contained in this filter dust there is a danger that returning the filter dust to the cement production process will result in a circulation with a constantly increasing pollutant content. In order to avoid such a circulation as far as possible or to keep it within acceptable limits, a sufficiently large proportion of the collected filter dust is usually removed from the cement clinker production plant together with the pollutant elements and compounds contained therein. However, because of the low-boiling heavy metal content, particularly mercury, and their compounds as well as other pollutants this filter dust removed from the production plant cannot be deposited in a normal (domestic) refuse dump but can only be deposited in a special refuse dump, and for this purpose a special dump material must first be prepared, for example from filter dust, cement and mixing water, which—apart from the dump volume—also leads to undesirably high additional costs. It is also necessary to think about the requirement to minimise residues.

The object of the invention, therefore, is to make further developments to a method of the type referred to in such a way that the advantages of this known construction as regards precipitation of the pollutants and also that filter dust collected in the first filter stage can be supplied as thoroughly as possible for problem-free further use.

Using the method according to the invention the proportion of low-boiling heavy metal and other pollutants and compounds thereof in the filter dust precipitated in the first filter stage is reduced by successive method steps. In a first method step a—sufficiently large—part-quantity of the precipitated filter dust, if necessary all of the filter dust, is heated in a desorption zone to a temperature at which the said pollutants and their compounds evaporate, that is to say are converted into their gaseous phase. In a second method step the vapours formed in the desorption zone are then passed with the aid of a carrier gas into a dust extraction zone and are there freed of the quantities of dust (dust particles), that is to say separation takes place into pure dust (dust particles) on the one hand and a pure mixture of vapour and carrier gas on the other hand which contains the volatile heavy metal pollutants, other volatile pollutants and also compounds of these heavy metal and other pollutants. Whilst the dust which has been freed or purified of these pollutants can be supplied for advantageous use, in a further method step the dedusted mixture of vapour and carrier gas is first of all cooled to a temperature which corresponds to the acceptable inlet temperature of this mixture into a filter unit containing a carbonaceous filter medium, whereupon this vapour/carrier gas mixture is passed through this filter unit. In this filter unit the heavy metal pollutants and other volatile pollutants contained in this mixture as well as any compounds of all these pollutants which may be present are filtered out of the mixture with the aid of the carbonaceous filter medium—as is known per se—by adsorption on the filter medium. Carrier gas or exit gas which has been purified of dust and the said volatile pollutants then leaves this filter unit and can preferably be delivered to or mixed with the raw exit gas streaming into the first filter stage (dust extraction stage).

Above all in the production of cement clinker the exit gases coming out of a corresponding kiln installation frequent contain a particularly high proportion of mercury, so that in these cases mercury in particular and its compounds as low-boiling heavy metal pollutants can be reduced in the filter dust of the first filter stage. However, principally thallium and its compounds as well as ammonium compounds in the filter dust can also be reduced in the same way.

The filter dust in the desorption zone can be heated to a temperature of approximately 100° to 500° C., preferably 200° to 350° C. and particularly 250° to 350° C. for desorption of the volatile pollutants and pollutant compounds contained therein. This heating is adapted above all to the pollutant content in the filter dust, but a sufficient residence time of the filter dust in this desorption zone should be taken into consideration in order to achieve a far-reaching or complete evaporation or desorption of the said pollutants contained in the filter dust, allowing a relatively short residence time in the desorption zone at a relatively high desorption temperature and a correspondingly longer residence time in this desorption zone at a relatively low desorption temperature. In order to carry out this method according to the invention technically a temperature range of approximately 250° to 350° C. (possibly also somewhat higher) and a residence time in the region of approximately 10 to 20 minutes can be regarded as particularly advantageous.

Since in the method according to the invention it is principally a matter of heating the filter dust in the aforementioned manner and keeping it for a sufficient and also predetermined time at the advantageous temperature, the method steps for reducing the said low-boiling pollutants and their compounds out of the filter dust can be carried out continuously or also discontinuously in a bath process. If only relatively low quantities of filter dust are collected in the first filter stage, then in general a discontinuous mode of operation can be advantageous and economic, whereas with larger quantities of filter dust a continuous mode of operation is generally to be preferred.

In the desorption zone it is generally possible to heat the filter dust directly or indirectly. However, indirect heating of the filter dust is particularly preferred, the filter dust then being removed from this desorption zone together with the formed pollutant vapours by means of infiltrated air which is drawn in as the carrier gas. This preferred type of indirect heating and removal by means of drawn-in infiltrated air involves only relatively small flow volumes, so that the corresponding apparatus for the succeeding dust precipitation as well as the filter unit can be designed for correspondingly small flow volumes with resulting small construction volumes, as a result of which moreover a correspondingly low energy requirement can be achieved. It should also be taken into account here that relatively small gas volume streams and thus relatively small flow speeds avoid an undesirably great raising of dust, so that a more intensive desorption treatment (with shorter residence time) in the desorption zone can be achieved. Finally, the indirect heating of the filter dust in the desorption zone also offers the advantage that the volume stream of the carrier gas can be selected or controlled as required, i.e. it is possible for example to operate with low flow speeds in a kiln serving as a desorption zone, this gas volume stream being determined above all by the heat input required in the filter dust and the necessary temperature.

In this method according to the invention the dedusted mixture of vapour and carrier gas can be cooled particularly simply to the acceptable inlet temperature for the filter unit if a cooling gas, particularly cooling air, is mixed directly with it in the region between the dust extraction zone and the filter unit.

Activated coke and/or activated carbon is used above all as the filter medium in the filter unit, and it can be particularly preferable to use activated cokes or activated carbons which are enriched with sulphuric acid, so that a markedly improved precipitation of heavy metals, particularly mercury and its compounds, can be achieved.

If in the last-mentioned connection it is assumed that activated coke and/or activated carbon are also used in the further filter stage through which the exit gases to be purified pass after the first filter stage and that these quantities of activated coke and activated carbon which during the process of purification of the exit gases are at least partially charged with sulphuric acid and sufficiently charged are replaced from time to time by fresh material, then quantities of activated coke and/or activated carbon charged with sulphuric acid and originating from the further filter stage can be used in an advantageous manner as the filter medium in the filter unit (after the desorption zone).

As has already been mentioned in the introduction, this method can be used in different kiln installations, particularly industrial kiln installations. However—as already indicated above—this method according to the invention is also particularly advantageous for the purification of the exit gases from kiln installations for the production of cement clinker, in which cement raw material is preheated in a preheating zone with hot exit gases from a final burning zone and is at least partially deacidified before the preheated material is finally burnt in the final burning zone to produce cement clinker. In this case the quantities of dust collected in the dust extraction zone after the desorption zone and freed—as explained above—of pollutants are returned in a particularly advantageous manner to the cement clinker production process. This means that, if only a specific proportion of the collected filter dust has undergone desorption in the desorption zone, this quantity of dust which has been freed of the pollutants is again delivered to the other quantity of filter dust, so that the resulting mixture is reduced sufficiently overall in its proportions of pollutants, particularly its quantities of mercury and its compounds as well as similarly low-boiling heavy metal pollutants, so that any circulations of pollutants which may result, particularly circulations of mercury, can be kept to an acceptably low level.

An apparatus for purifying exit gases from kiln installations, particularly industrial kiln installations (above all for the production of cement clinker is characterised according to the invention by a device which is arranged near the first filter and connected to its dust discharge device and is constructed for the reduction of low-boiling heavy metal pollutants and their compounds from the filter dust, wherein the said device contains a desorption kiln for heating filter dust to evaporation temperature for the said pollutants, a dust precipitator to which the mixture of vapour and carrier gas from the desorption kiln can be passed, a cooling arrangement for the dedusted mixture of vapour and carrier gas arranged downstream of the dust precipitator as well as a filter unit which is arranged behind the cooling arrangement and in which several filter beds to which the mixture of vapour and carrier gas is passed alternately are provided with a carbonaceous filter medium for separation of the heavy metal pollutants and their compounds of this flowing mixture.

The invention will be explained in greater detail below with the aid of the drawings. These drawings are simplified representations and in them:

Figure 1:
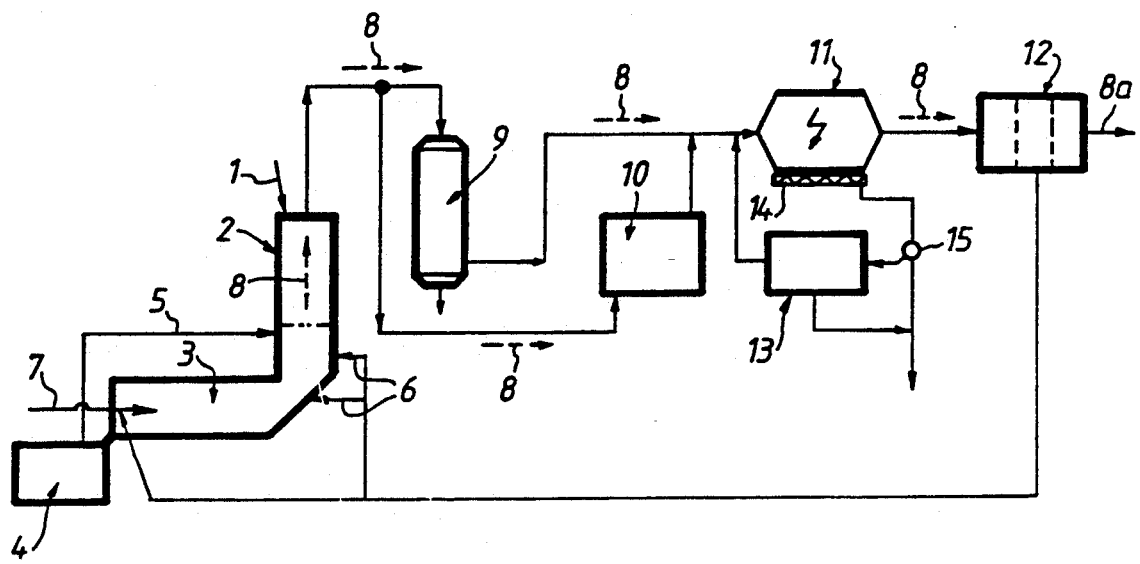
FIG. 1 shows a general diagram of a kiln installation for the production of cement clinker with a device for purifying the exit gases from this kiln installation.

FIG. 1 shows a particularly typical possible application of the method according to the invention as described above using a kiln installation for the production of cement clinker. This kiln installation can be constructed in any suitable manner, so that only the most important parts of the installation are described briefly below. Accordingly this kiln installation contains a preheater 2 which serves for preheating and at least partial deacidification of the raw material (arrow 1), a final burning kiln in the form of a rotary kiln 3 which serves for final burning of the preheated and deacidified material, and a cooler 4 for cooling the finally burnt cement clinker. Heated exhaust air from the cooler (arrow 5) and additional fuel (arrows 6) for the far-reaching deacidification (precalcination) of the preheated raw material are delivered to the lower part of the preheater 2. The rotary kiln 3 is fired from its material discharge side (arrow 7). The exit gases (arrow 8) from the rotary kiln 3 pass through the preheater 2 in a manner which is known per se (for the purpose of preheating the raw material) and then pass out of the kiln installation as required either in direct operation via a cooling tower 9 or in interconnected operation via a raw grinding mill (which serves for drying and grinding the raw material) into a multi-stage filter zone which contains a first filter, preferably an electrostatic filter 11, as the first filter stage and at least one second filter 12 as a further filter stage.

Whereas the first filter 11 is constructed for collecting dust from the kiln exit gases, the second filter 12 preferably contains several filter chambers through which the dedusted exit gases flow in succession and which each contain a carbonaceous filter medium (in particular activated coke and/or activated carbon) which after it has reached a certain charge with $NH_x$ compounds, heavy metals, trace elements and sulphur dioxide can be at least partially removed from the corresponding filter chamber and replaced. The filter medium removed here is preferably delivered to the inlet region of the rotary kiln 3 (in the region of the precalcination zone at the lower end of the preheater 2) and possibly or alternatively to the combustion point (at arrow 7) of the rotary kiln 3. The construction and operation of this multi-stage filter zone (11, 12) can largely correspond to that of the earlier patent referred to in the introduction or to a similar manner of operation and therefore does not need to be explained in greater detail here.

Figure 2:
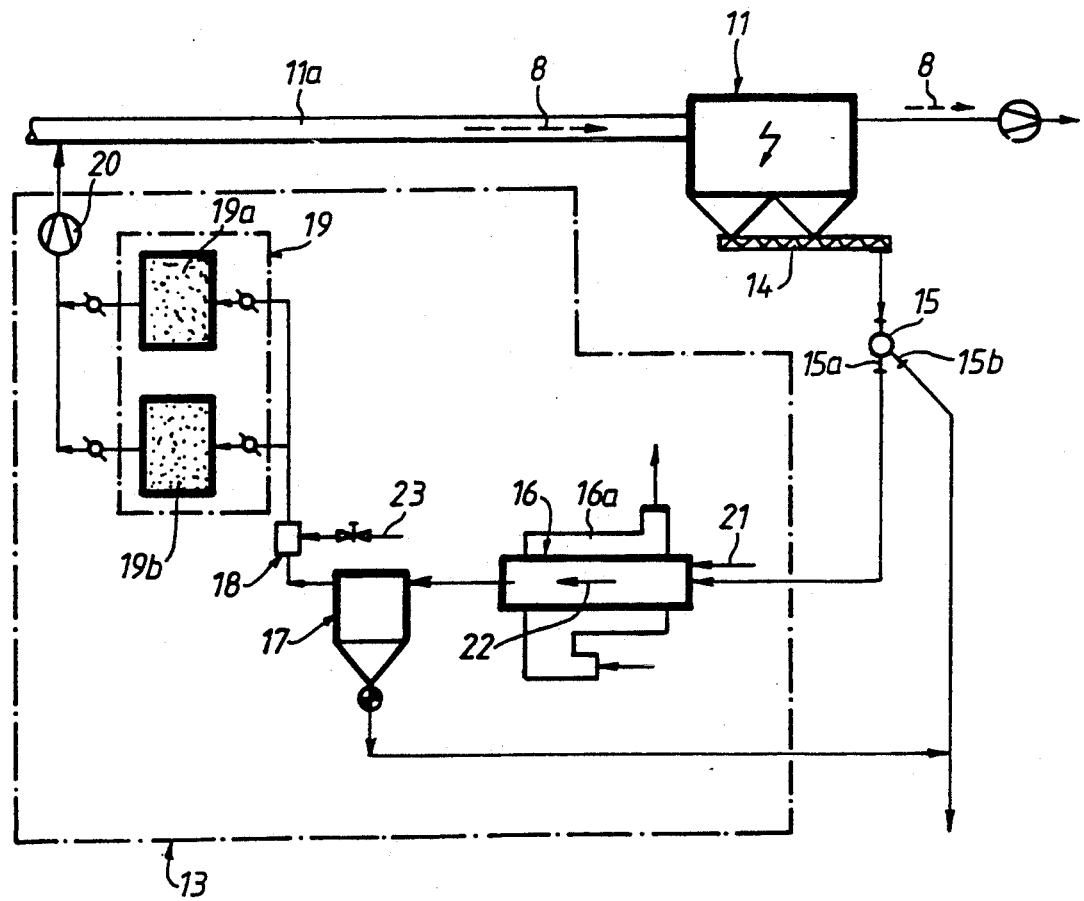
FIG. 2 shows an enlarged partial diagram of a part of the installation for pollutant reduction in the filter dust arranged immediately after a dust-collecting filter (1st filter) of the exit gas purification device.

For carrying out the method according to the invention which is described above, means 13 is arranged in the immediate proximity of the first filter 11 for pollutant reduction in the filter dust which has been collected in this first filter 11 out of the exit gas stream 8 from the kiln or the preheater. In the general diagram according to FIG. 1 this means 13 is represented merely in the form of a box-shaped block, whereas in FIG. 2 it is shown in greater detail on an enlarged scale with those parts which are of particular interest here and in conjunction with the first filter 11, and this will be dealt with in greater detail below.

For collection and discharge of the dust collected in the first filter 11 from the exit gases 8 this first filter 11 is provided with a dust discharge device (e.g. a discharge screw) 14. Distributing means 15, which is preferably adjustable, for distributing quantities of dust and which has two branch ducts 15a and 15b is advantageously arranged after this dust discharge device 14, and of these two branch ducts the branch duct 15a takes at least a part-quantity of the filter dust into the pollutant reduction means 13 whilst the second branch duct 15b is connected to the kiln installation for the production of cement clinkers in order to return filter dust into the cement clinker production process.

The pollutant reduction means 13 contains as its principal parts a desorption kiln 16, a dust collector 17 arranged after this desorption kiln in the direction of flow (cf. arrows), a cooler 18 arranged downstream of collector 17 and a filter 19 which is arranged behind the cooler 18 and in which several filter beds 19a, 19b are provided which can be operated alternately and which each contain a carbonaceous filter medium, preferably activated coke and/or activated carbon, for collection of volatile heavy metal pollutants, particularly mercury, and their compounds, as well as other volatile pollutant compounds from a flowing mixture of vapour and carrier gas. This filter unit 19 in turn is arranged upstream a suction fan 20 in order to extract and remove the gases (exit gases) purified in the filter unit 19 and in particular to deliver them to the exit gases 8 flowing to the first filter 11 in an inlet duct 11a.

The desorption kiln 16 which forms a desorption zone is preferably an indirectly heated kiln which can be constructed in any suitable manner, and in the illustrated embodiment a rotary kiln is provided, the shell of which is surrounded by a heating jacket 16a which can be heated in a manner which is known per se with a suitable fuel (e.g. oil or gas). In this case such a heating system is provided that in this desorption kiln 16 a heating of the delivered filter dust to an evaporation temperature for the aforementioned types of pollutant, particularly mercury and its compounds, is achieved and thus a desorption of these low-boiling pollutants out of the filter dust can be effected.

Because of the induced draught from the suction fan 20, an adjustable or selectable quantity of infiltrated air (arrow 21) can be drawn through the interior of the desorption kiln 16 in the direction of the arrow 22 in such a way that the heating and desorption taking place in the kiln are restricted as little as possible and the resulting pollutant vapours together with the dust particles freed of these pollutants are discharged from this kiln 16 in the form of a mixture of vapour and carrier gas and delivered to the precipitator 17 arranged after it. This dust precipitator 17 can be of any suitable construction, for example in the form of a simple but sufficiently effective dust settling chamber or also in the form of at least one dust collecting cyclone. It is important above all that the dust or the dust particles which has/have been freed of the evaporated pollutants can be precipitated in this dust precipitator 17 and returned to the cement clinker production process—together with the quantity of dust in which the pollutant has not been reduced—for further use. The mixture of vapour and carrier gas released from this proportion of dust flows off out of the dust precipitator 17 and on the way to the filter unit 19 is passed through the cooler 18 in which it is cooled preferably with the aid of cooling air (arrow 23) to a temperature which is acceptable for introduction of this mixture of vapour and carrier gas into one of the filter beds 19a or 19b or into the carbonaceous filter medium contained therein. This filter unit inlet temperature can lie approximately in the region of 100° C. When this mixture is being passed through the activated coke or activated carbon filter bed 19a or 19b mercury in particular and its compounds, but also possibly other similarly low-boiling heavy metal pollutants and possibly ammonium compounds, are precipitated out of the mixture, so that a purified exit gas comes out of the gas outlet side of the filter unit 19 and can be drawn off via the suction fan 20 in the manner mentioned.

Each of the filter beds 19a, 19b which are alternately supplied via indicated adjusted flaps with the said mixture contains a replaceable stock preferably of activated coke and/or activated carbon. These can be relatively small filter beds which are designed for a sufficient precipitation of the pollutants which are gaseous (vaporised) and at least partially condensed because of the cooling (by the cooler 18).

Since the pollutant reduction means 13 and above all the desorption kiln 16 are arranged in the immediate proximity of the first filter 11, the filter dust to be removed can enter this desorption kiln 16 at a relatively high temperature. In this way the necessary additional installation parts (e.g. ducts, flaps and the like) as well as the energy costs (particularly the heating costs for the kiln 16 and operating costs for the suction fan 20) can be kept to acceptably low levels.

Finally, it should again be emphasised that the exit gases (arrow 8) coming from the kiln installation can otherwise be purified in a similar manner in the multi-stage filter zone (with the filters 11 and 12) by physical-chemical mechanisms (adsorption of the pollutants, chemisorption, catalytic action of the carbonaceous filter mediums), as is described for instance in the earlier proposal disclosed in U.S. Pat. No. 5,169,611.

I claim:

1. A method of purifying kiln exit gases having entrained therein dust containing vaporizable pollutants, said method comprising precipitating dust from said gases in a first filter stage; heating the precipitated dust in a desorption zone to a temperature at which said pollutants vaporize; separating vaporized pollutants from said dust; cooling the vaporized pollutants; and passing the vaporized pollutants through a second filter stage containing a filter medium on which the pollutants are adsorbable.

2. The method according to claim 1 wherein the precipitated dust is heated in the desorption zone to a temperature of between about 100° and 500° C.

3. The method according to claim 1 wherein said method is a continuous process.

4. The method according to claim 1 wherein the steps of said method are performed discontinuously in a batch process.

5. The method according to claim 1 wherein the pollutants include mercury and its compounds, $NH_x$, $SO_2$, and $NO_x$.

6. The method according to claim 1 including removing the vaporized pollutants and dust from said desorption zone by passing a carrier gas stream through said zone.

7. The method according to claim 1 wherein the vaporized pollutants are cooled following their separation from the precipitated dust and upstream of the second filter stage.

8. The method according to claim 1 wherein said filter medium is carbonaceous.

9. The method according to claim 8 wherein the carbonaceous filter medium is enriched with sulphuric acid.

10. The method according to claim 1 wherein the gases from which the volatile pollutants are filtered are introduced to the kiln exit gases between the kiln and the first filter stage.

11. The method according to claim 1 wherein the kiln exit gases are derived from the production of cement.

12. The method according to claim 1 wherein said kiln exit gases are generated from a process for the production of cement and including returning at least a portion of precipitated dust from which pollutants have been separated to the cement production process upstream from said first filter stage.

13. The method according to claim 12 including delivering an additional portion of precipitated dust from which pollutants have been separated to said desorption zone.

14. Apparatus for purifying kiln exit gases having entrained therein dust containing vaporizable pollutants, said apparatus comprising means for delivering said exit gases and entrained dust to a first filter stage for precipitating said dust; means for delivering precipitated dust from said first filter stage to a desorption zone; means for heating precipitated dust in said desorption zone to a temperature to vaporize said pollutants; means for separating vaporized pollutants from said dust; means for cooling the vaporized pollutants; and means for delivering the cooled vaporized pollutants to a second filter stage containing a filter medium on which the pollutants are adsorbable.

15. Apparatus according to claim 14 wherein said desorption zone comprises an indirectly heated kiln.

16. Apparatus according to claim 14 wherein said filter medium comprises a carbonaceous material.

17. Apparatus according to claim 16 wherein said carbonaceous material is enriched with sulphuric acid.

18. Apparatus according to claim 14 wherein the means for separating vaporized pollutants from said dust comprises means for passing a carrier gas through said desorption zone for entraining the separated vaporized pollutants and said dust, and means for collecting the separated dust.

19. Apparatus according to claim 14 wherein the cooling means is downstream of said desorption zone and upstream of the second filter stage.

20. Apparatus according to claim 14 including means for delivering gases from said second filter stage to the means for delivering the exit gases to said first filter stage and between said kiln and said first filter stage.

* * * * *

UNITED STATES PATENT AND TRADEMARK OFFICE
CERTIFICATE OF CORRECTION

PATENT NO. : 5,264,013
DATED : November 23, 1993
INVENTOR(S) : Ludger Brentrup

It is certified that error appears in the above-identified patent and that said Letters Patent is hereby corrected as shown below:

On the title page, item [57] Abstract, lines 1-16:

Please substitute the following Abstract of the Disclosure for the printed Abstract.

-- A method and apparatus for purifying kiln exit gases having entrained therein dust containing vaporizable pollutants. The dust is precipitated in a first filter stage and such dust is heated to a temperature at which the pollutants are vaporized. The dust and vaporized pollutants are separated, the dust being collected and the dedusted vaporized pollutants passed through a second filter stage in which the pollutants are adsorbed. --.

UNITED STATES PATENT AND TRADEMARK OFFICE
CERTIFICATE OF CORRECTION

PATENT NO. : 5,264,013
DATED : November 23, 1993
INVENTOR(S) : Ludger Brentrup

It is certified that error appears in the above-indentified patent and that said Letters Patent is hereby corrected as shown below:

Column 4, line 24, after "clinker" insert a closed parenthesis.

Signed and Sealed this

Seventh Day of June, 1994

Attest:

BRUCE LEHMAN

Attesting Officer  Commissioner of Patents and Trademarks